Patented Mar. 30, 1948

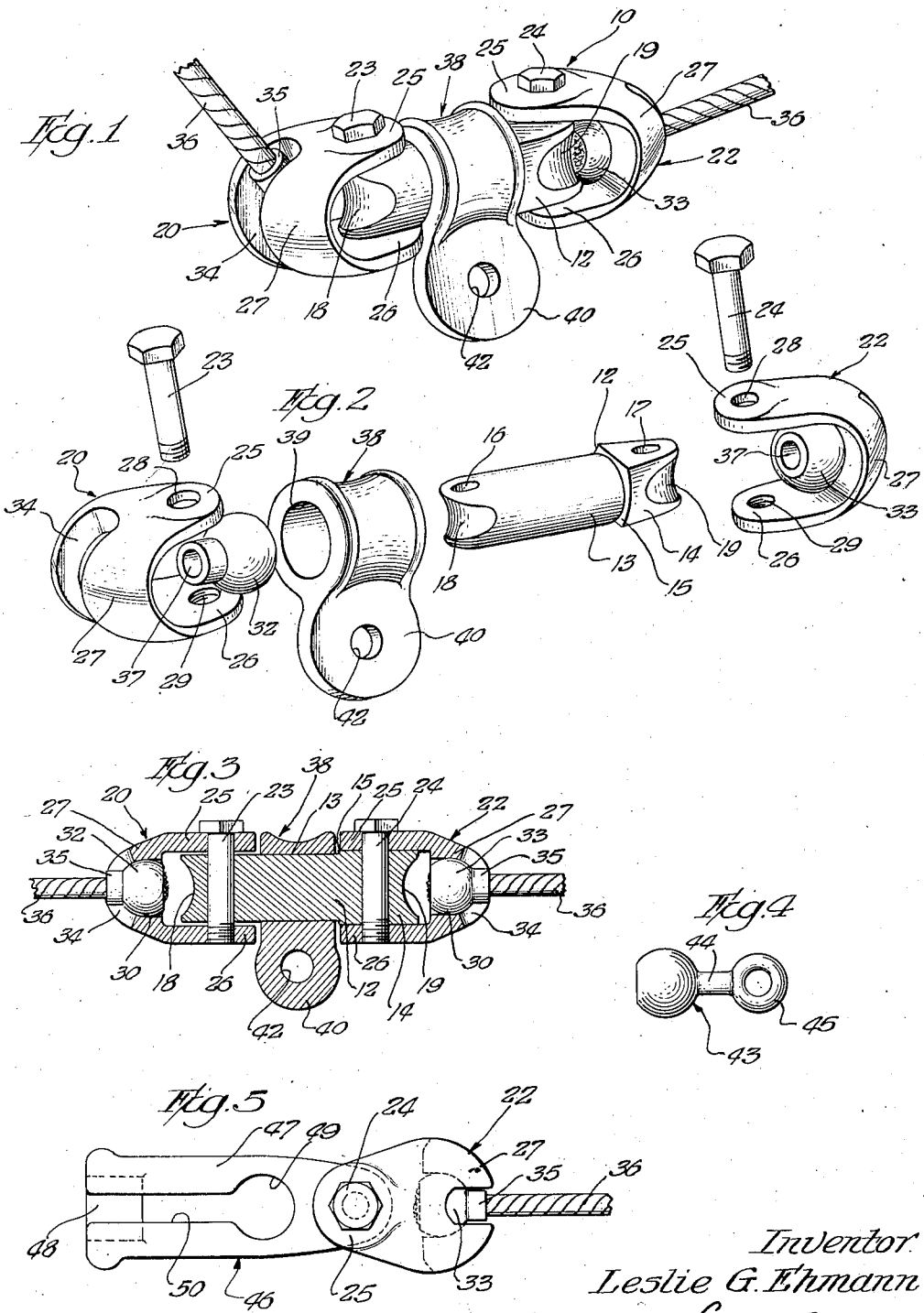

2,438,548

UNITED STATES PATENT OFFICE 2,438,548

SWIVEL CONNECTION

Leslie G. Ehmann, Portland, Oreg., assignor to Electric Steel Foundry, Portland, Oreg., a corporation of Oregon Application December 29, 1944, Serial No. 570,374

11 Claims. (Cl. 287—76)

This invention relates generally to swivel connections and more particularly to those of a type adapted for use with cables, ropes, chains or the like.

A general object of this invention is to provide an improved swivel connection, at least one end of which is adapted to be connected to a cable, chain, rope or the like, and which includes joints providing for swivelling movement in a plurality of angularly related planes.

It is another object of the invention to provide a swivel connection including a ball and socket joint capable of rotational movement and swinging movement in a plane transverse to the rotational movement, as well as a second joint capable of swinging movement in a plane transverse to that of the swinging movement of the ball and socket joint.

The invention has for an additional object the provision of a three-way swivel connection in which opposed end connecting parts are swingable in two transverse planes and an intermediate connecting part is rotatably supported.

Other objects and advantages of the invention will be apparent from the following description and the accompanying drawing in which similar characters of reference indicate similar parts throughout the several views.

Fig. 1 is a perspective view of a swivel connection embodying my invention in a preferred form and indicating the connection thereof to cables;

Fig. 2 is an exploded view in perspective showing the parts of the swivel connection of Fig. 1 in disassembled relation;

Fig. 3 is a longitudinal sectional view of the swivel connection shown in Figs. 1 and 2;

Fig. 4 is a side elevational view of a modification of a part of the preferred swivel connection; and Fig. 5 is a side elevational view of a modified form of my swivel connection.

Although not at all limited thereto, the swivel connection of my invention is particularly adapted for use in making connections to or between sections of a main drag line used in logging and/or the choker rigging which generally accompanies the main drag line. In the exemplary embodiments for instance, Figs. 1, 2 and 3 illustrate an adaptation of the invention to a three-way swivel connection of a type useable for connecting a choker rigging between sections of a main drag line. The portion of the structure shown in Fig. 4 illustrates a modified end connecting portion adapted to the use of chain as the connected line. The modification of my swivel connection shown in Fig. 5 depicts its application to use in conjunction with a butt hook for making a connection between cable sections or to a choker rigging.

Referring to the drawings, and particularly Figs. 1, 2 and 3 thereof, a three-way swivel 10 has an intermediate connecting pin 12, the outer surface of which intermediate its ends provides a longitudinal and cylindrical bearing surface 13. One end preferably has an enlarged head portion 14 providing a locating shoulder 15, while the other end is desirably cylindrical and of a size corresponding to that of the bearing surface 13. Near the ends lateral bores 16 and 17 provide connecting bearings which, in the present instance, are desirably parallel and in the same plane. Also, the opposite end surfaces 18 and 19 are preferably concavely cut away in concentric relation with respect to the axes of the bores 16 and 17, respectively.

At opposite ends of the connecting pin 12 similar basket-like sockets 20 and 22 are rotatably connected thereto by fastening means such as bolts 23 and 24, respectively. The basket-like sockets 20 and 22 each have substantially parallel projecting side lug portions 25 and 26 and an intermediate connecting portion 27, the side lug portions 25 and 26 being adapted to straddle the ends of the intermediate connecting pin 12. In the disclosed form, the side lug portions 25 have apertures 28 through which the bolts 23 and 24 pass, while the side lug portions 26 have threaded apertures 29 which fit the threaded ends of the bolts. Thus, in the assembly the bolts 23 and 24 extend through the apertures 28 in the side lug portions 25 of the basket-like sockets and through the bores 16 and 17 in the pin 12 and are threaded into the apertures 29 to secure the sockets to the ends of the connecting pin. The connecting pin 12 being rotatable relative to both of the bolts 23 and 24, the opposed basket-like sockets 20 and 22, in the disclosed embodiment, are swingable in a common plane relative to the ends of the connecting pin.

Within the connecting portions 27 socket recesses 30 provide seats for ball connectors 32 and 33. In addition, substantially arcuate elongated slots 34 in the connecting portions 27 of the basket-like sockets adjoin the socket recesses 30 to provide passages for making connections to the ball connectors 32 and 33. The elongation of the slots 34 is desirably in a direction parallel to the axes of the bolts 23 and 24, so that the ball connectors are movable in the socket recesses in a direction transverse to the swinging movement of the sockets 20 and 22 relative to the ends of the connecting pin 12. Cylindrical flange extensions 35 are desirably formed integrally on the ball connectors 32 and 33 and extend outwardly through the slots 34 to serve as guides and to protect connected cables, such as 36, from wear.

To facilitate the connection of cables, such as 36, to the ball connectors 32 and 33, those connectors are desirably drilled, as at 37, axially of the projecting flange extensions 35. The methods of securing the cable within the drilled openings of the ball connectors are well known in the art.

A ring connector 38 has a longitudinal opening 39 which fits over the bearing surface 13 between the projecting side lugs 25 and 26 of the basket-like sockets 20 and 22. The connector 38 is rotatable relative to the connecting pin 12 and has radially projecting from one side thereof an integral connecting lug 40. An aperture 42 in the connecting lug 40 is provided for making connection to means such as a chain or choker rigging which is to be connected to a main drag line represented by the cables 36.

From the foregoing description of the illustrated three-way swivel connection, it may be understood that, since the ring connector 38 is rotatable relative to the connecting pin 12, the choker rigging or other connecting means attached to the connecting lug 40 is relatively free to assume a position on any side of the three-way swivel connection. In addition, the basket-like sockets which are swingably connected to the ends of the connecting pin 12, together with the coacting ball connectors 32 and 33, provide for practically universal swinging movement of the connected lines within predetermined limits. Since the ball connectors 32 and 33 may rotate in the socket recesses 30, undesirable twisting of the line or cable is prevented.

When connections are to be made to lines other than metal cable, such as to a chain, a ball connector 43, such as that shown in Fig. 4, is preferred. This modified type of ball connector has an integral stem 44 projecting from one side of the ball, and on the projecting end of which is a connecting ring 45. The ring 45 may either be of a size which will pass through the socket recess 30 and slot 34 for assembly of the ball connector with the basket-like socket, or the stem 44 may be separable from the ball connector 43 for attachment thereto for installation. In the latter instance, the stem 44 may be threaded into a suitable threaded opening in the ball connector.

In the modified form of my swivel connector shown in Fig. 5, the basket-like socket 22 and ball connector 33 are similar to those shown in Figs. 1 to 3, inclusive, and previously described. The ball connector utilized in this modified form may, of course, be of the type shown in Fig. 4.

Instead of being connected to the connecting pin, as in the swivel connector shown in Figs. 1 to 3, inclusive, the basket-like socket 22 of Fig. 5 is rotatably connected by the bolt 24 to the end of a butt hook 46. The butt hook 46 has an elongated body 47 at the end of which, opposite the basket-like socket, is an integral socket 48 adapted releasably to engage and hold a ferrule on the end of a cable or line, such as that utilized in a choker rigging. A transverse opening 49 near the mid-portion of the body of the butt hook is of somewhat larger diameter than the ferrule which is adapted to be held by the socket 48, so that the ferrule may be freely passed therethrough for making connection to the butt hook. A longitudinal slot 50 in the body 47 connects the transverse opening 49 and the socket 48 and is of a width narrower than the opening 49 or socket 48, but sufficient to permit the passage of the cable. Connection of a line or cable to the butt hook 46 is accomplished by insertion of the ferrule through the opening 49 and passage of the cable through the slot 50 and subsequent movement of the line and butt hook to positions such that the ferrule is seated in the socket 48. Release of the connection is accomplished in a reverse manner.

From consideration of the modified swivel connection shown in Fig. 5, it may be understood that the basket-like socket and coacting ball provide a swivel connection such that the butt hook 46 may be swung freely in transverse directions relative to the connected line 36, combination of which transverse swinging movements provides for practically universal resulting movements within predetermined limits.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A swivel connection comprising, in combination, an intermediate connecting element providing an axial bearing surface intermediate its ends, secondary connecting elements connected to the ends of the intermediate connecting element for swinging movement in a plane extending longitudinally of the intermediate connecting element, end connecting elements connected to the secondary connecting elements for swinging movements in planes transverse to the planes of movement of the secondary connecting elements, and intervening connecting means mounted for rotary movement on said bearing surface.

2. A swivel connection comprising, in combination, an intermediate connecting element providing a longitudinal bearing surface intermediate its ends, means for making connection to one of said ends, ball and socket means having parts swingable in two transverse directions for making connection to the other of said ends, and intermediate connecting means rotatable on said bearing surface for making another connection to said intermediate connecting means.

3. A swivel connection comprising, in combination, a connecting element having a connecting socket at one end thereof, and ball and socket means having parts swingable in two transverse directions for making connection to the other end thereof, said ball and socket means including a basket-like socket having side portions straddling said other end of the connecting element and a ball seated in said socket for movement relative thereto.

4. A swivel connection comprising, in combination, a first connecting element having means for making connections to the ends thereof, at one of said ends said means including a basket-like socket having side portions straddling the end of said first connecting element, said socket also having an intermediate portion with an elongated slot, and means connecting said side portions to said one end for swinging movement in a plane longitudinal of the first element, and a ball connecting element having a projecting guide flange seated in said basket-like socket with the flange projecting into said slot for swinging movement in a plane transverse to said longitudinal plane.

5. A swivel connection comprising, in combination, a pin having a bearing portion intermediate its ends, basket-like sockets having opposed side lug portions straddling the ends of said pin, means connecting the side lug portions of said sockets to the ends of said pin for swinging movement, means serving as the male members of ball and socket joints and carried by said sockets for lateral swinging movement, and a ring rotatably mounted on the bearing portion of said pin and having a projecting side connecting lug thereon.

6. A swivel connection comprising, in combination, a pin having a bearing portion intermediate its ends and serving as the mid-portion of the connection, basket-like sockets having opposed side lug portions overlapping the ends of said pin and intermediate connecting portions integral with said lug portions, said connecting portions each having a slot therein elongated in a direction to extend longitudinally between said side lug portions, means for rotatably connecting the side lug portions of said sockets to the ends of said pin for swinging movement in a common plane, connecting balls carried by the sockets and having projecting guide flanges thereon which extend into said slots, said balls and their guide flanges being carried by the sockets and slots for swinging movement relative to the sockets in a plane extending longitudinally of the slots and transverse to said common plane, and a ring rotatably mounted on the bearing portion of said pin and having a projecting side connecting lug thereon.

7. A swivel connection comprising, in combination, a pin having a bearing portion intermediate its ends, basket-like sockets having opposed side lug portions straddling the ends of said pin, said sockets also having intermediate portions containing slots, means connecting the side lug portions of said sockets to the ends of said pin for swinging movement, a connecting ball carried by each of said sockets and having a projecting guide flange thereon which extends into said slot in the socket, said balls being movable in their respective sockets and each being guided by the said flange and slot for swinging movement in a plane lateral to the plane of swinging movement of the socket, and a ring rotatably mounted on the bearing portion of said pin and having a projecting side connecting lug thereon.

8. In a swivel connection, the combination comprising a substantially basket-like connecting element having opposed projecting and substantially parallel side portions and a connecting portion including a socket, shaft-like connecting means extending between said side portions and including a bearing having an axis, and a ball connecting element seated in said socket, said connecting portion of the basket-like connecting element having an arcuately curved portion with an elongated slot therethrough opening outwardly from said socket, said slot being elongated in a plane passing through the axis of said connecting means and in the direction of said arcuate curvature, and said ball having thereon a projecting guide flange extending into and movable in said slot in a plane coincidental with the axis of said connecting means so that the bearing of said connecting means and ball connecting element together provide for universal joint movement.

9. In a swivel connection, the combination comprising a substantially basket-like connecting element having opposed side portions projecting in substantially parallel relationship from a connecting portion including a socket, means for making a pivotal connection to said side portions, a ball connecting element seated in said socket for providing a second pivotal connection to the basket-like connecting element, and coacting parts on said socket and ball restricting relative movements of the ball and socket to a plane coincidental with the axis of said pivotal connection to the side portions.

10. In a swivel connection, the combination comprising a substantially basket-like connecting element having opposed side portions projecting from a connecting portion including a socket and an adjoining lateral slot, means for making a pivotal connection to said side portions, and a ball connecting element seated in said socket and having an integral connector ring and intermediate connecting leg extending in a substantially radial direction from one side thereof, said connecting leg extending through and being movable longitudinally of said slot in a plane coincidental with the axis of the means for making the pivotal connection to the side portions.

11. In a swivel connection, the combination comprising a substantially basket-like connecting element having opposed side portions projecting in substantially parallel relationship from a connecting portion including a socket, means for making a pivotal connection to said side portions, and means seated in said socket for providing a second pivotal connection to the basket-like connecting element, said pivotal connections having axes angularly displaced to provide for movements of said basket-like element and said means seated in the socket in laterally disposed planes.

LESLIE G. EHMANN.

REFERENCES CITED

The following references are of record in the file of this patent:

UNITED STATES PATENTS

| Number | Name | Date |
|---|---|---|
| 1,132,716 | Hanson | Mar. 23, 1915 |
| 1,225,100 | Aubrey | May 8, 1915 |
| 2,176,519 | Anderson | Oct. 17, 1939 |

FOREIGN PATENTS

| Number | Country | Date |
|---|---|---|
| 127,889 | Austria | Apr. 25, 1932 |